US010027622B2

(12) United States Patent
Singh et al.

(10) Patent No.: US 10,027,622 B2
(45) Date of Patent: Jul. 17, 2018

(54) RECOVERING LOST DEVICE INFORMATION IN CABLE NETWORKS

(71) Applicant: Cisco Technology, Inc., San Jose, CA (US)

(72) Inventors: Hemant Singh, Westford, CA (US); William Beebee, Lowell, CA (US); Madhu Sudan, San Jose, CA (US); Bernard E. Volz, Center Harbor, NH (US); Chad Mikkelson, Arlington, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 779 days.

(21) Appl. No.: 13/756,338

(22) Filed: Jan. 31, 2013

(65) Prior Publication Data
US 2014/0215091 A1 Jul. 31, 2014

(51) Int. Cl.
*H04L 29/12* (2006.01)
*H04L 29/14* (2006.01)
(Continued)

(52) U.S. Cl.
CPC ...... *H04L 61/2015* (2013.01); *H04L 12/2878* (2013.01); *H04L 12/2898* (2013.01);
(Continued)

(58) Field of Classification Search
CPC ............. H04L 61/2015; H04L 12/2801; H04L 29/12009; H04L 12/2856; H04L 45/02;
(Continued)

(56) References Cited

U.S. PATENT DOCUMENTS 6,018,767 A * 1/2000 Fijolek et al. ............... 709/218
6,240,464 B1 * 5/2001 Fijolek et al. ............... 709/250
(Continued)

FOREIGN PATENT DOCUMENTS

CN 104782105 A 7/2015

OTHER PUBLICATIONS

Yassini et al., Planet Broadband, Sep. 18, 2003, Cisco Press, pp. 1-6.*
(Continued)

*Primary Examiner* — Douglas Blair
*Assistant Examiner* — Joseph M Cousins
(74) *Attorney, Agent, or Firm* — Hickman Palermo Becker Bingham LLP

(57) ABSTRACT

In one embodiment, methods are described for recovering lost customer premises equipment (CPE) information on a cable modem termination system (CMTS) in the presence of only Dynamic Host Control Protocol Version 6 (DHCPv6) CONFIRM. A CMTS purges routing information for an Internet Protocol Version 6 (IPv6) node, such as a CPE router, in response to detecting an interface reset for the IPv6 node. IPv6 addresses and prefixes information for the IPv6 node is gleaned from a DHCPv6 CONFIRM message received from the IPv6 node. By sending portions of the IPv6 addresses and prefixes information within a DHCPv6 LEASEQUERY message, a DHCPv6 CONFIRM message with an embedded DHCPv6 LEASEQUERY message, or a DHCPv6 CONFIRM message with an Interface-ID option, a reply message can be received that contains the purged routing information for the IPv6 node.

12 Claims, 5 Drawing Sheets

(51) Int. Cl.
*H04L 29/06* (2006.01)
*H04L 12/28* (2006.01)
*H04L 12/749* (2013.01)

(52) U.S. Cl.
CPC ........ *H04L 45/741* (2013.01); *H04L 61/6059* (2013.01); *H04L 69/14* (2013.01); *H04L 69/40* (2013.01)

(58) Field of Classification Search
CPC ............... H04L 69/40; H04L 29/12018; H04L 29/12273; H04L 61/00; H04L 61/10; H04L 61/2053; H04L 63/083; H04L 69/329; H04L 12/2878; H04L 12/2898; H04L 12/5601; H04L 12/5695; H04L 12/66; H04L 29/06; H04L 29/12207; H04L 29/12216; H04L 41/0663; H04L 47/15; H04L 47/724; H04L 47/805; H04L 47/822; H04L 61/103; H04L 61/20; H04L 61/6059; H04L 63/12; H04L 67/06; H04L 67/14; H04L 67/01; H04L 67/145; H04L 67/24; H04L 67/28; H04L 67/34; H04L 69/14; H04L 12/18; H04L 12/2861; H04L 12/287; H04L 12/2872; H04L 12/2874; H04L 12/2876; H04L 12/42; H04L 12/422; H04L 12/427; H04L 12/433; H04L 12/437; H04L 12/461; H04L 12/4625; H04L 12/4637; H04L 12/5692; H04L 12/6418; H04L 2012/5612; H04L 2012/5618; H04L 2012/5627; H04L 2012/5638; H04L 2012/5656; H04L 2012/5665; H04L 2012/6424; H04L 29/12028; H04L 29/12264; H04L 41/0213; H04L 41/0803; H04L 41/0809; H04L 41/0896; H04L 41/5003; H04L 41/5022; H04L 41/5054; H04L 41/5077; H04L 41/508; H04L 45/04; H04L 45/18; H04L 45/22; H04L 45/302; H04L 45/306; H04L 45/50; H04L 47/788; H04L 47/827; H04L 49/1553; H04L 49/25; H04L 49/30; H04L 49/3063; H04L 49/3081; H04L 49/40; H04L 61/1511; H04L 61/2046; H04L 61/6086; H04L 63/0876; H04L 63/10; H04L 63/102; H04L 63/1466; H04L 63/164; H04L 67/16; H04L 67/2852; H04L 61/205; H04L 45/741; H04W 80/04; H04W 88/005; H04W 8/08
USPC ........................................ 370/254, 331, 401
See application file for complete search history.

(56) References Cited

U.S. PATENT DOCUMENTS

| | | | |
|---|---|---|---|
| 7,706,301 B2* | 4/2010 | Petrescu et al. | H04L 12/56 370/254 |
| 8,788,826 B1* | 7/2014 | Zhao et al. | 713/171 |
| 2003/0145075 A1* | 7/2003 | Weaver | H04B 3/46 709/223 |
| 2004/0177133 A1* | 9/2004 | Harrison | H04L 61/2015 709/220 |
| 2007/0214270 A1* | 9/2007 | Absillis | H04L 61/2015 709/227 |
| 2009/0028083 A1* | 1/2009 | Beser | H04L 41/0806 370/311 |
| 2009/0238193 A1* | 9/2009 | Nishida | H04W 8/08 370/401 |
| 2010/0202462 A1* | 8/2010 | Riddel | H04L 12/2801 370/400 |
| 2012/0243536 A1* | 9/2012 | Fernandez Gutierrez | 370/390 |

OTHER PUBLICATIONS

Droms et al., Dynamic Host Configuration Protocol for IPv6 (DHCPv6), Network Working Group, Request for Comments 3315, Jul. 2003, pp. 1-101.*
Brzozowski et al., DHCPv6 Leasequery, Network Working Group, Request for Comments 5007, Sep. 2007, pp. 1-23.*
Nortel Networks, CMTS 1000 Installation Manual V1.2, Mar. 1999, p. 1-246.*
Woundy Comcast Cable K Kinner Cisco Systems, "Dynamic Host Configuration Protocol", dated Feb. 1, 2006, 28 pages.
European Patent Office, "Search Report" in application No. PCT/US2014/013354, dated May 22, 2014, 12 pages.
Droms R. et al., "Dynamic Host Configuration Protocol for IPv6", dated Jul. 1, 2003, 84 pages.
Claims in European application No. PCT/US2014/013354, dated May 2014, 2 pages.
Brzozowski Comcast Cable K Kinnear B Volz S Zeng Cisco Systems J et al., "DHCPv6 Leasequery", dated Sep. 1, 2007, 24 pages.

* cited by examiner

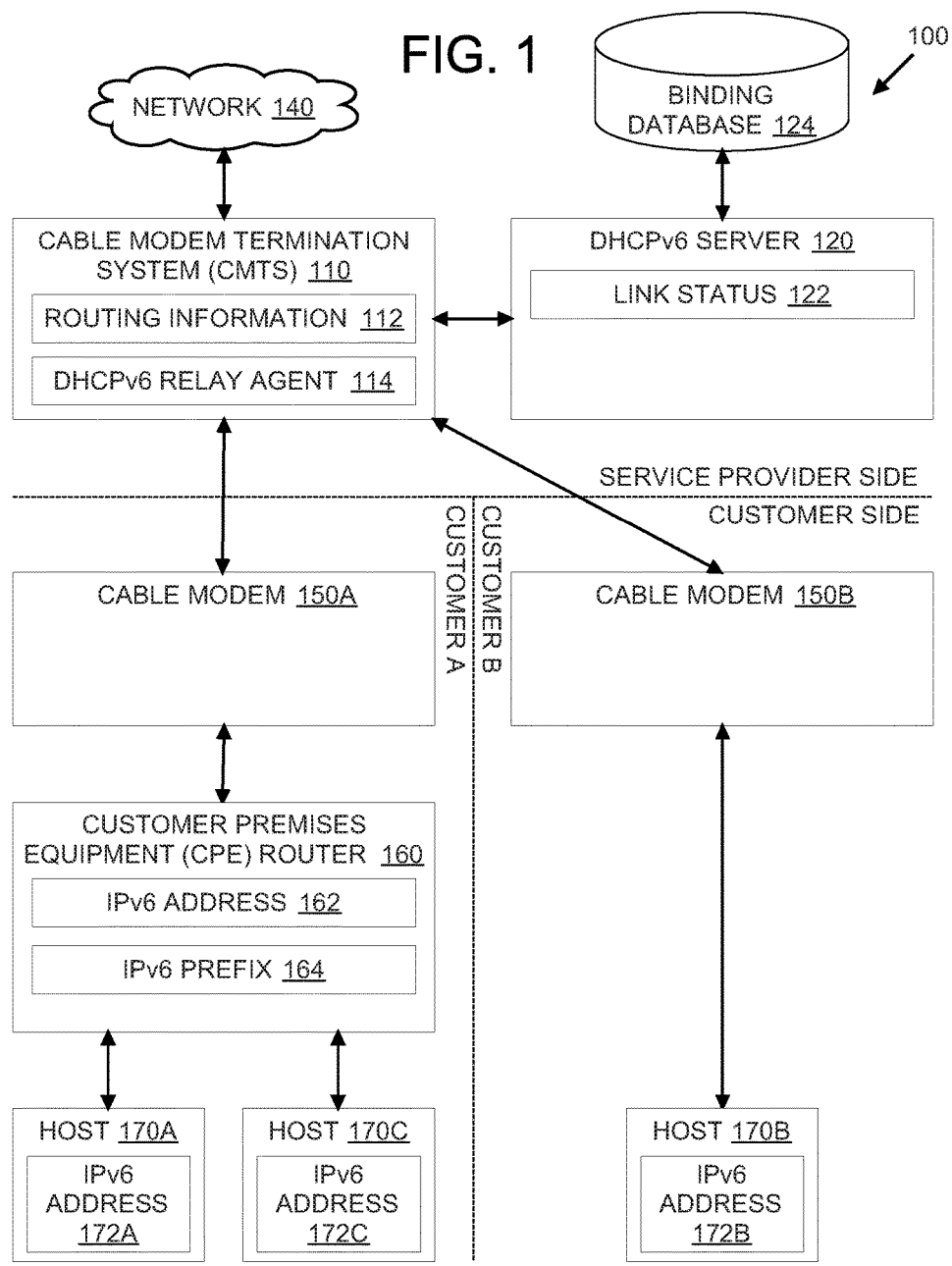

202
Purge routing information relating to an IPv6 node in response to detecting an interface reset for the IPv6 node

204
Glean IPv6 addresses and prefixes information, including an IPv6 address for the IPv6 node, from a DHCPv6 CONFIRM message received from the IPv6 node

206
Send, to a DHCPv6 server, a DHCPv6 LEASEQUERY message using the IPv6 address for the IPv6 node

208
Receive a DHCPv6 LEASEQUERY-REPLY from the DHCPv6 server, the DHCPv6 LEASEQUERY-REPLY indicating a confimation of a valid lease and comprising the purged routing information for the IPv6 node

FIG. 2B

212
Purge routing information relating to an IPv6 node in response to detecting an interface reset for the IPv6 node

214
Glean IPv6 addresses and prefixes information, including an IPv6 address for the IPv6 node, from a DHCPv6 CONFIRM message received from the IPv6 node

216
Relay, to a DHCPv6 server, the DHCPv6 CONFIRM message with an embedded DHCPv6 LEASEQUERY message using the IPv6 address for the IPv6 node

218
Receive a DHCPv6 REPLY from the DHCPv6 server, the DHCPv6 REPLY including a DHCPv6 LEASEQUERY-REPLY indicating a confirmation of a valid lease and comprising the purged routing information for the IPv6 node

222
Purge routing information relating to an IPv6 node in response to detecting an interface reset for the IPv6 node

224
Gleaning IPv6 addresses and prefixes information for the IPv6 node from a DHCPv6 CONFIRM message received from the IPv6 node

226
Relay, to a DHCPv6 server, the DHCPv6 CONFIRM message with an Interface-ID option using the IPv6 addresses and prefixes information for the IPv6 node

228
Receive a DHCPv6 REPLY from the DHCPv6 server, the DHCPv6 REPLY including the Interface-ID option comprising the purged routing information for the IPv6 node

RECOVERING LOST DEVICE INFORMATION IN CABLE NETWORKS

TECHNICAL FIELD

The present disclosure generally relates to routing of data in a network. The disclosure relates more specifically to methods for recovering lost information about customer premises equipment (CPE) devices used with a cable modem termination system (CMTS) in the presence of specified messages.

BACKGROUND OF THE DISCLOSURE

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

To address the depletion of available Internet Protocol Version 4 (IPv4) addresses, the adoption and deployment of IPv6 is accelerating. With IPv6 providing 128 bit addresses compared to the 32 bit addresses of IPv4, hosts connected to a network such as the Internet can communicate point-to-point using global addresses while avoiding workarounds developed for the IPv4 address space limitation, such as network address translation (NAT).

However, because workarounds such as NAT are no longer utilized in IPv6, a service provider must maintain routing information to successfully route to all hosts connected to the service provider, a task that might have been previously handled in part by a router with NAT. This routing information may be maintained at a switch or router at the edge of the provider side, for example as a cable modem termination system (CMTS), a digital subscriber line access multiplexer (DSLAM), a cellular broadband concentrator, or another access concentrator.

BRIEF DESCRIPTION OF THE DRAWINGS

In the drawings:

FIG. 1 is a representation of an example network for illustrating methods for recovering lost CPE information on a CMTS in presence of only DHCPv6 CONFIRM;

FIG. 2A is a flow diagram illustrating a method for recovering lost CPE information on a CMTS in presence of only DHCPv6 CONFIRM by using DHCPv6 Leasequery;

FIG. 2B is a flow diagram illustrating a method for recovering lost CPE information on a CMTS in presence of only DHCPv6 CONFIRM by using embedded DHCPv6 Leasequery;

FIG. 2C is a flow diagram illustrating a method for recovering lost CPE information on a CMTS in presence of only DHCPv6 CONFIRM by using an Interface-ID option;

DETAILED DESCRIPTION OF EXAMPLE EMBODIMENTS

Figure 3:
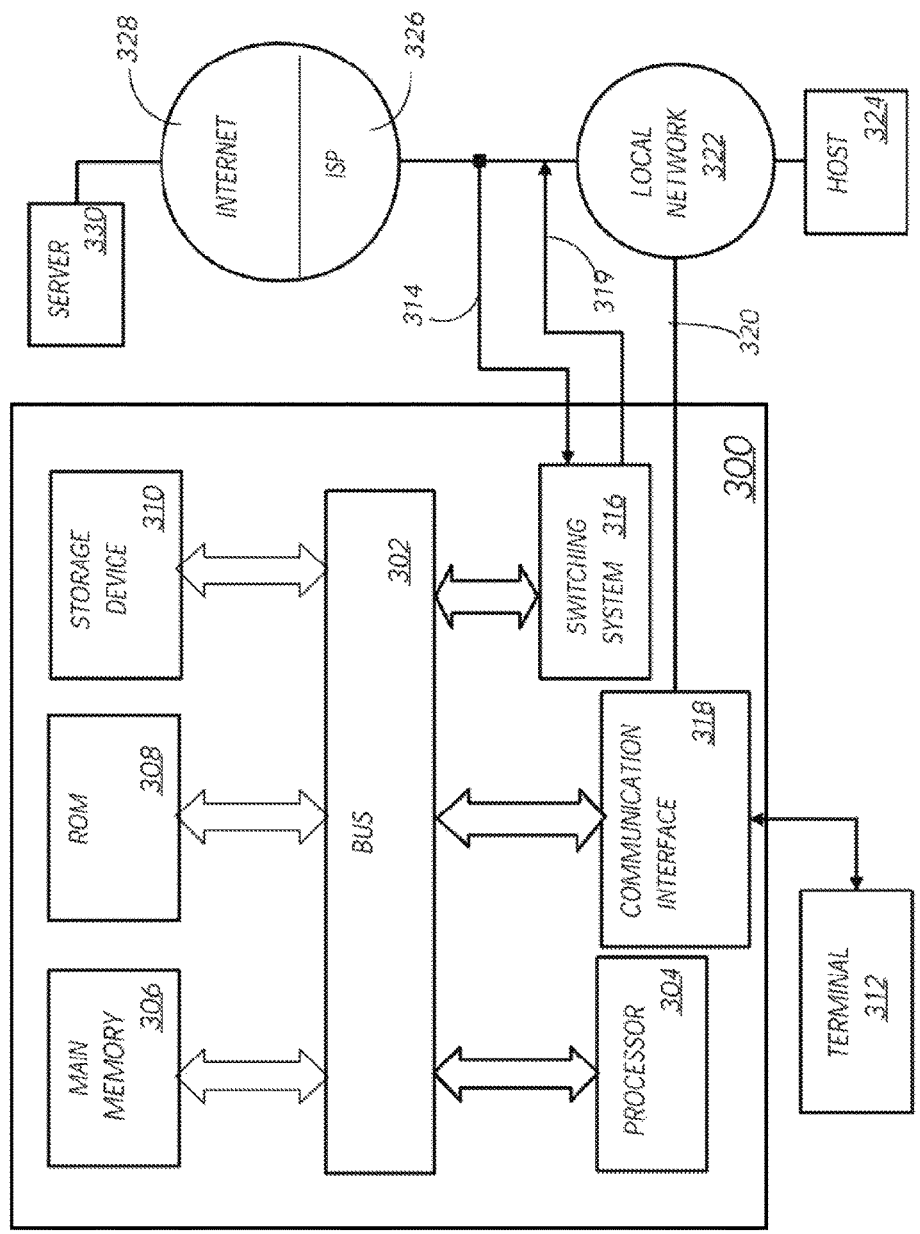
FIG. 3 is a block diagram that illustrates a computer system upon which a method for recovering lost CPE information on a CMTS in presence of only DHCPv6 CONFIRM may be implemented.

Embodiments of the present disclosure provide for recovering lost device information in cable networks. For example, a method and apparatus for recovering lost CPE information on a CMTS in the presence of only DHCPv6 CONFIRM are described. In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

Embodiments are described herein according to the following outline:

1.0 General Overview
    2.0 Structural Overview
    3.0 Recovery by Matching DHCPv6 Messages
        3.1 Matching by DHCPv6 DUID
    4.0 Recovery by IPv6 Neighbor Discovery
    5.0 Recovery by DHCPv6 Leasequery
        5.1 Reducing Leasequery Messaging
    6.0 Recovery by Relay Agent Interface-ID Option
    7.0 Recovery by Reinitiating DHCPv6 Transaction
    8.0 Implementation Mechanisms—Hardware Overview
    9.0 Extensions and Alternatives
    1.0 General Overview In one embodiment, methods are described for recovering lost customer premises equipment (CPE) information on a cable modem termination system (CMTS) in the presence of only Dynamic Host Control Protocol Version 6 (DHCPv6) CONFIRM. A CMTS purges routing information for an Internet Protocol Version 6 (IPv6) node, such as a CPE router, in response to detecting an interface reset for the IPv6 node. IPv6 addresses and prefixes information for the IPv6 node is gleaned from a DHCPv6 CONFIRM message received from the IPv6 node. By sending the IPv6 addresses and prefixes information within a DHCPv6 LEASEQUERY message, a DHCPv6 CONFIRM message with an embedded DHCPv6 LEASEQUERY message, or a DHCPv6 CONFIRM message with an Interface-ID option, a reply message can be received that contains the purged routing information for the IPv6 node.

In other aspects, embodiments provide a computer apparatus and a computer-readable medium configured to carry out the foregoing methods.

As previously discussed, while a CMTS is utilized as a specific example, the concepts of the present application are applicable to any access concentrator. Furthermore, the lost routing information can be recovered for any IPv6 node and is not limited to lost CPE information. For example, lost routing information can also be recovered for bridged hosts, for CMs, for DSL modems, and for other IPv6 nodes.

2.0 Structural Overview

The methods can be further understood with respect to FIG. 1 which depicts a representation of an example network for illustrating methods for recovering lost CPE information on a CMTS in presence of only DHCPv6 CONFIRM. Diagram 100 of FIG. 1 includes CMTS 110, DHCPv6 server 120, binding database 124, network 140, cable modem 150A, cable modem 150B, CPE router 160, host 170A, host 170B, and host 170C. CMTS 110 includes routing information 112 and DHCPv6 relay agent 114. DHCPv6 server 120 includes on-link status 122. CPE router 160 includes IPv6 address 162 and IPv6 prefix 164. Host 170A, 170B, and 170C respectively include IPv6 address 172A, 172B, and 172C.

As shown in FIG. 1, diagram 100 is divided into a service provider side and a customer side with two customers A and B. For simplicity, diagram 100 of FIG. 1 only depicts two customer sites. In other embodiments, large numbers of customers with varying network configurations may connect to CMTS 110.

CMTS 110 functions as the access concentrator in diagram 100, allowing multiple connections from cable modems to share a link to network 140, which may be a public network such as the Internet. As previously described, CMTS 110 is only one example access concentrator, and could also be a DSLAM or a cellular broadband concentrator, in which case cable modems 150A-150B may be respectively replaced with DSL modems or wireless broadband modems.

To configure all the IPv6 nodes on the customer side, a DHCPv6 server 120 is present on the server provider side, along with a binding database 124. The binding database 124 contains information for authenticating IPv6 nodes such as existing connection leases, permissible hardware or MAC address ranges, and other security bindings, allowing DHCPv6 server 120 to refuse configuration of IPv6 nodes that do not have proper permissions to access the service provider. While binding database 124 is shown as a separate database in diagram 100, it may also be embedded as part of DHCPv6 server 120. The DHCPv6 server 120 may also maintain an on-link status 122 for tracking the on-link status or liveliness of IPv6 nodes.

In an embodiment, all the IPv6 nodes on the customer side, including CPE router 160, have previously initiated stateful DHCPv6 to obtain valid IPv6 addresses and prefixes from DHCPv6 server 120. CMTS 110 can glean routing information from DHCPv6 messages for stateful DHCPv6 passed between CPE routers, such as CPE router 160, and DHCPv6 server 120. The gleaning process may be carried out by DHCPv6 relay agent 114, which forwards DHCP messages between DHCPv6 server 120 and IPv6 nodes such as CPE router 160.

The gleaned routing information maintained by CMTS 110 may include details such as media access control (MAC) or hardware addresses, ports or virtual circuits for routing, global addresses (IA_NA), router subnet prefixes (IA_PD), and other details for hosts or endpoints, cable modems (CMs), and CPE including CPE routers. Accordingly, routing information 112 may already be populated with all the routing information necessary to reach any IPv6 node on the customer side.

Since cable modems 150A-150B operate within a customer site environment, the cable modems may experience resets due to a power cycle, device reboot, firmware upgrade, power outage, movement to another room or location, or for other reasons. To maintain consistency at CMTS 110, the routing information for a cable modem may be purged if a reset is detected.

For example, the service provider may limit the maximum number of CPEs allowed at a particular customer site. To enforce this limit, cable modems 150A-150B may be configured for a maximum number of CPEs. However, if cable modems 150A-150B are reset or go offline on CMTS 110, the maximum CPE count between cable modems 150A-150B and CMTS 110 can be mismatched. Additional CPEs may therefore connect to cable modems 150A-150B that would otherwise exceed the CPE limit. To maintain a consistent maximum CPE count, all routing information for a reset cable modem must be purged from routing information 112 of CMTS 110, including any connected CPE routers and hosts.

Thus, when a cable modem is reset, the routing information for that cable modem and any nodes behind it may be purged from routing information 112. If cable modem 150A is reset, then CMTS 110 may be required to purge IPv6 address 162, IPv6 prefix 164, IPv6 address 172A, IPv6 address 172C, and any associated hardware or MAC addresses. Once cable modem 150A reestablishes a connection to CMTS 110, the lost routing information needs to be recovered at routing information 112 to properly route traffic to and from the IPv6 nodes behind cable modem 150A.

After cable modem 150A is reset, cable modem 150A issues a link up/down indication to CPE router 160. In turn, CPE router 160 resets its network interface and issues a DHCPv6 CONFIRM message to determine whether the existing addresses are still valid for reuse. According to the DHCPv6 specification (section 18.1.2 of RFC 3315), the DHCPv6 CONFIRM message MUST be sent when a client link has potentially moved, such as when a CPE receives link-down/up indication. A DHCPv6 REPLY message is provided by DHCPv6 server 120 in response to validating all the addresses in the DHCPv6 CONFIRM message.

However, since the DHCPv6 CONFIRM message along with other inquiries such as the SOLICIT or REQUEST messages originate from the untrusted customer side CPE router 160, the information in those messages should not be trusted by CMTS 110 and should not be used to glean addresses. While CMTS 110 may trust information gleaned from messages originating from the provider side DHCPv6 server 120, the DHCPv6 REPLY to a DHCPv6 CONFIRM does not contain any addresses to glean. Furthermore, the use of DHCPv6 CONFIRM to check CPE router prefixes is not yet standardized. Accordingly, DHCPv6 gleaning by itself is insufficient to recover the lost routing information for the CPE router.

Accordingly, various methods of recovering lost routing information 112 at CMTS 110 are disclosed. For purposes of illustrating clear examples, the description herein may focus specifically on recovering the lost routing information for CPE router 160, including IPv6 address 162 and IPv6 prefix 164, but the methods can be generally applied for any IPv6 node, for example host 170B as a bridged host.

3.0 Recovery by Matching DHCPv6 Messages

One approach is to match DHCPv6 CONFIRM and REPLY messages according to the transaction-id of the messages. This requires that CMTS 110 implement a special case state machine at DHCPv6 relay agent 114 to record incoming DHCPv6 CONFIRM messages from IPv6 nodes, which are then matched by transaction-id to outgoing DHCPv6 REPLY messages from DHCPv6 server 120.

There are several drawbacks with this approach. First, because the implementation requires a state machine to be implemented at CMTS 110, a large amount of memory may be consumed to maintain the state of the DHCPv6 messages for each IPv6 node. CMTS 110 may support a large number of CPEs, for example 128K, incurring a large memory footprint to maintain the DHCP message states. Some access concentrators such as cellular broadband concentrators may also support a large number of concurrent clients, such as over 500K, further increasing the memory footprint. Furthermore, if routing information 112 is indexed by hardware or MAC addresses, then extra table lookups are required to match transaction-ids.

Second, in the case of CPE routers such as CPE router 160, the lost subnet prefix or IPv6 prefix 164 must also be recovered by CMTS 110. However, under the current RFC 3633 regarding IPv6 prefix options for DHCPv6, the use of the DHCPv6 CONFIRM message for prefixes is specifically prohibited. While others have submitted a draft Internet standard to the IETF, titled "draft-ietf-dhc-dhcpv6-stateful-issues", to allow the use of DHCPv6 CONFIRM messages for prefixes, the CPE router 160 may not necessarily be configured to send the DHCPv6 CONFIRM message for prefixes since the draft is not yet ratified as a RFC. Thus, matching the DHCPv6 CONFIRM and REPLY messages may fail to retrieve the prefix for CPE routers.

Third, because the DHCPv6 CONFIRM messages originate from untrusted hosts on the customer side, there is the potential for spoofing attacks from rogue clients. For example, a rogue client or even an authenticated client may insert into a DHCPv6 CONFIRM message an address within the range of an existing up-linked prefix within on-link status 122 that does not correspond to any existing lease within binding database 124. The DHCPv6 server 120 only checks whether the addresses in the DHCPv6 CONFIRM message are on-link based on network configuration of DHCPv6 server 120. Thus, DHCPv6 server 120 returns a valid DHCPv6 REPLY message. DHCPv6 relay agent 114 would then read the REPLY message, match it to the CONFIRM message, and update routing information 112 with the invalid address, allowing attackers to obtain unauthorized access to the service provider.

3.1 Matching by DHCPv6 DUID

A variation of the DHCPv6 message matching approach is to match by the DHCPv6 DUID, rather than by the transaction-id. However, all the drawbacks described above in Section 3.0 still apply. Additionally, because the DUID may be up to 128 octets long in comparison to a 32 bit transaction-id block, the memory footprint at CMTS 110 is even greater.

4.0 Recovery by IPv6 Neighbor Discovery

Another approach is to utilize the Neighbor Discovery protocol specified by IPv6. IPv6 nodes should issue a Neighbor Solicitation for Duplicate Address Detection or NS(DAD) on any interface reset to check whether the existing address at the node can be reused. According to RFC 4862, a CPE router such as CPE router 160 must issue a NS(DAD) for each IPv6 address used by the CPE in response to an interface reset. These NS(DAD) messages may then be gleaned at CMTS 110 using the ND Proxy feature to recover the lost routing information.

Gleaning the NS(DAD) for routing information has several drawbacks. First, the NS(DAD) is only sent to check for duplicate addresses, and therefore does not recover the lost prefixes for CPE routers, such as IPv6 prefix 164. Some other method must be utilized to recover the prefixes such as the DHCPv6 message matching approach as described above.

Second, certain hosts, such as Linux hosts, fail to send the NS(DAD) on an interface reset. If host 170B were such a host, then IPv6 address 172B would not be recoverable if CMTS 110 expected the NS(DAD) to be sent from host 170B.

Third, even when the NS(DAD) is sent, CMTS upstream network congestion may result in the NS(DAD) message being dropped, preventing routing information recovery. By default, CPE (an IPv6 node) routers must send only one NS(DAD) message for each IPv6 address, which may cause a large burst of upstream traffic to occur when the CPE routers support many clients. CMTS 110 may thus drop network packets having NS(DAD) messages if the customer exceeds an upstream bandwidth limit defined by a provider service level agreement.

5.0 Recovery by DHCPv6 Leasequery

Another approach is to send a DHCPv6 Leasequery ("LQv6") request in response to receiving a DHCPv6 CONFIRM message from an IPv6 node. LQv6 is described in RFC 5007, which is publicly available in the online RFC pages part of the IETF website, and is hereby incorporated by reference in its entirety for all purposes as if fully set forth herein. Since the LQv6 request is checked against lease bindings rather than merely on-link status, LQv6 provides authentication against rogue clients. Additionally, since the LQv6 reply can specify prefixes, both addresses and prefixes can be recovered without requiring the DHCPv6 CONFIRM message to support prefixes. Even further, since both CPE routers and hosts will send a DHCPv6 CONFIRM message in response to a reset, a corresponding LQv6 request will be triggered for any customer side IPv6 node that undergoes an interface reset, allowing a complete recovery for all lost routing information regardless of the IPv6 node being a bridged host or a router.

FIG. 2A is a flow diagram illustrating a method for recovering lost CPE information on a CMTS in presence of only DHCPv6 CONFIRM by using DHCPv6 Leasequery. With reference to FIG. 1, in block 202 of process 200, CMTS 110 purges routing information 112 of information relating to CPE router 160 in response to detecting an interface reset for CPE router 160. As previously described, cable modem 150A may be disconnected or reset due to any number of causes such as a power cycle. Using any method available to CMTS 110, such as IPv6 Neighbor Discovery, the disconnection or interface reset of CPE router 160 behind cable modem 150A may be detected, and routing information 112 may be purged of routing information for CPE router 160, including IPv6 address 162 and IPv6 prefix 164.

In block 204, CMTS 110 gleans IPv6 addresses and prefixes information for CPE router 160, including IPv6 address 162, from a DHCPv6 CONFIRM message received from CPE router 160. As previously discussed, CPE router 160 may issue a link up/down indication to CPE router 160. In turn, CPE router 160 resets its network interface and issues a DHCPv6 CONFIRM message to determine whether the existing addresses are still valid for reuse. As discussed above, a draft Internet standard to the IETF, titled "draft-ietf-dhc-dhcpv6-stateful-issues", is proposed to allow the use of DHCPv6 CONFIRM messages for prefixes as well. DHCPv6 relay agent 114 of CMTS 110 may thus glean IPv6 addresses and prefixes information of CPE router 160 from the DHCPv6 CONFIRM message.

In block 206, CMTS 110 sends, to DHCPv6 server 120, a DHCPv6 LEASEQUERY (LQv6) message using IPv6 address 162 from the IPv6 addresses and prefixes information of block 204. The format of the LQv6 message is specified in greater detail in RFC 5007, but for the purposes of the present example, the LQv6 message shall include at least the global address for the IPv6 node in question, or IPv6 address 162 of CPE router 160.

In block 208, CMTS 110 receives a DHCPv6 LEASEQUERY-REPLY (LQv6 reply) from DHCPv6 server 120. A successful LQv6 reply indicates a confirmation that DHCPv6 server 120 found valid lease bindings in binding database 124 for the requested address in the LQv6 message. As specified in RFC 5007, the OPTION_CLIENT_DATA in the reply may comprise both the IAADDR and the IAPREFIX, and can therefore recover both IPv6 address 162 as well as IPv6 prefix 164. Thus, CMTS 110 can repopulate routing information 112 with the routing information concerning CPE router 160 that was previously purged in block 202, completing the recovery of the purged data. Note that the recovery only relies on the presence of DHCPv6 CONFIRM for IPv6 address 162 and does not require that CPE router 160 issue a NS(DAD) message or a DHCPv6 CONFIRM message for IPv6 prefix 164.

5.1 Reducing Leasequery Messaging

While the DHCPv6 Leasequery approach provides many advantages, it also requires an explicit Leasequery protocol message exchange between CMTS 110 and DHCPv6 server 120. In some cases, the access concentrator may already send LQv6 messages. For example, CMTS 110 may send DHCPv6 LEASEQUERY messages for upstream packet source-address verification. In this case, multiple DHCPv6 LEASEQUERY messages will be exchanged, which may be undesirable. For example, to limit the possibility of denial of service attacks, it may be preferable to limit the number of DHCPv6 LEASEQUERY messages accepted at DHCPv6 server 120.

One method of reducing the number of LQv6 messages is to instead embed the LQv6 request and response within the original DHCPv6 messages. For example, the DHCPv6 protocol may be modified to define a new relay agent DHCPv6 option, allowing the LQv6 request to be embedded within the Relay-Forward of the DHCPv6 CONFIRM and the LQv6 response to be embedded within the Relay-Reply of the DHCPv6 REPLY. The OPTION_CLIENT_DATA may be embedded in the option request option (ORO) of the Relay-Forward.

FIG. 2B is a flow diagram illustrating a method for recovering lost CPE information on a CMTS in presence of only DHCPv6 CONFIRM by using an embedded DHCPv6 Leasequery protocol. Block 212 and block 214 of process 210 correspond to block 202 and block 204 of process 210, respectively.

In block 216, CMTS 110 relays, to DHCPv6 server 120, the DHCPv6 CONFIRM message from block 214 with an embedded DHCPv6 LEASEQUERY (LQv6) message using IPv6 address 162 of the IPv6 addresses and prefixes information from block 214. Thus, block 216 corresponds to block 206, but embeds the LQv6 message within the DHCPv6 CONFIRM message rather than sending a separate LQv6 message.

In block 218, CMTS 110 receives a DHCPv6 REPLY from DHCPv6 server 120, the DHCPv6 REPLY including a DHCPv6 LEASEQUERY-REPLY (LQv6 reply). Thus, block 218 corresponds to block 208, but receives the LQv6 reply within the DHCPv6 REPLY message rather than from a separate LQv6 reply message. Blocks 214, 216 and 218 may be carried out by DHCPv6 relay agent 114. In this manner, the number of LQv6 messages can be reduced. However, the DHCPv6 protocol has to support the embedding of LQv6 messages in relayed messages.

6.0 Recovery by Relay Agent Interface-ID Option

Yet another approach is to utilize the Interface-ID option defined by the DHCPv6 standard (RFC 3315). The Interface-ID can be inserted by DHCPv6 relay agent 114 into the DHCPv6 CONFIRM Relay-Forward message and may include the IPv6 addresses and IPv6 prefixes for CPE routers and other IPv6 nodes. The Interface-ID may also identify the hardware or MAC address of the IPv6 nodes. This approach takes advantage of the property that the DHCPv6 server 120 copies the Interface-ID as opaque data into the DHCPv6 REPLY Relay-Reply message, from which CMTS 110 may glean the lost CPE routing information.

However, since the DHCPv6 server only checks the on-link status 122 and not the binding database 124 when generating the DHCPv6 REPLY, this approach also has the same security problems with a rogue client as described above with respect to Sections 3.0 and 3.1. Additionally, since the Interface-ID option is inserted into the DHCPv6 CONFIRM message, in order to recover prefixes, the CPE router must support the sending of DHCPv6 CONFIRM messages for prefixes.

FIG. 2C is a flow diagram illustrating a method for recovering lost CPE information on a CMTS in presence of only DHCPv6 CONFIRM by using an Interface-ID option. Block 222 and block 224 of process 220 correspond to block 202 and block 204 of process 210, respectively.

In block 226, CMTS 110 relays, to DHCPv6 server 120, the DHCPv6 CONFIRM message from block 224 with an Interface-ID option using the IPv6 addresses and prefixes information from block 224. Since the DHCPv6 CONFIRM message is being used rather than an LQv6 message, DHCPv6 server 120 only checks against on-link status 122 rather than binding database 124.

In block 228, CMTS 110 receives a DHCPv6 REPLY from DHCPv6 server 120, the DHCPv6 REPLY including the Interface-ID option. The Interface-ID option is copied as an opaque value into the DHCPv6 REPLY by DHCPv6 server 120. The receipt of a DHCPv6 REPLY at CMTS 110 only indicates a valid on-link status rather than valid lease bindings for the requested IPv6 node. However, the lost routing information is recoverable by examining the Interface-ID. Blocks 224, 226 and 228 may be carried out by DHCPv6 relay agent 114.

7.0 Recovery by Reinitiating DHCPv6 Transaction

Another approach is to force a DHCPv6 transaction to be reinitiated, for example by always returning a NotOnLink status code in a DHCPv6 REPLY. This can be setup by configuring DHCPv6 server 120 to always return a NotOnLink status code in a DHCPv6 REPLY message to a DHCPv6 CONFIRM message. Alternatively, DHCPv6 relay agent 114 can intercept DHCPv6 REPLY messages to change any status code of not NotOnLink to NotOnLink. As a result, the DHCPv6 client or CPE router 160 will restart a new DHCPv6 transaction with a DHCPv6 Solicit, and the addresses and prefixes may be gleaned once again by CMTS 110.

However, this approach may result in unpredictable consequences for CPE router 160. For example, after receiving the NotOnLink status code, CPE router 160 may remove any addresses and prefixes associated with existing DHCPv6 leases. As a result, interrupted packets may occur in the time gap while CPE router 160 initiates the new DHCP transaction for those same addresses and prefixes, potentially causing connections to drop and other unintended behaviors.

8.0 Implementation Mechanisms—Hardware Overview

FIG. 3 is a block diagram that illustrates a computer system 300 upon which an embodiment of the present disclosure may be implemented. The preferred embodiment is implemented using one or more computer programs running on a network element such as a router device. Thus, in this embodiment, the computer system 300 is a router.

Computer system 300 includes a bus 302 or other communication mechanism for communicating information, and a processor 304 coupled with bus 302 for processing information. Computer system 300 also includes a main memory 306, such as a random access memory (RAM), flash memory, or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, flash memory or optical disk, is provided and coupled to bus 302 for storing information and instructions.

A communication interface 318 may be coupled to bus 302 for communicating information and command selections to processor 304. Interface 318 is a conventional serial interface such as an RS-232 or RS-422 interface. An external terminal 312 or other computer system connects to the computer system 300 and provides commands to it using the interface 314. Firmware or software running in the computer system 300 provides a terminal interface or character-based command interface so that external commands can be given to the computer system.

A switching system 316 is coupled to bus 302 and has an input interface 314 and an output interface 319 to one or more external network elements. The external network elements may include a local network 322 coupled to one or more hosts 324, or a global network such as Internet 328 having one or more servers 330. The switching system 316 switches information traffic arriving on input interface 314 to output interface 319 according to pre-determined protocols and conventions that are well known. For example, switching system 316, in cooperation with processor 304, can determine a destination of a packet of data arriving on input interface 314 and send it to the correct destination using output interface 319. The destinations may include host 324, server 330, other end stations, or other routing and switching devices in local network 322 or Internet 328.

The present disclosure is related to the use of computer system 300 for the techniques and functions described herein in a network system. According to one embodiment of the present disclosure, such techniques and functions are provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the present disclosure. Thus, embodiments of the present disclosure are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Communication interface 318 also provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with certain embodiments of the present disclosure, one such downloaded application provides for the techniques and functions that are described herein.

The received code may be executed by processor 304 as it is received, and/or stored in storage device 310, or other non-volatile storage for later execution. In this manner, computer system 300 may obtain application code in the form of a carrier wave.

9.0 Extensions and Alternatives

In the foregoing specification, specific embodiments of the present disclosure have been described. It will, however, be evident that various modifications and changes may be made thereto without departing from the broader spirit and scope of the disclosure. The specification and drawings are, accordingly, to be regarded in an illustrative rather than a restrictive sense.

Any appropriate routing protocol and mechanism can be adopted to implement embodiments of the present disclosure. The method steps set out can be carried out in any appropriate order and aspects from the examples and embodiments described juxtaposed or interchanged as appropriate.

What is claimed is:

1. A data processing method comprising:

purging routing information relating to an untrusted Internet Protocol Version 6 (IPv6) node in response to detecting an interface reset for the untrusted IPv6 node, the routing information comprising at least an IPv6 address and one or more IPv6 prefixes for the untrusted IPv6 node;

after the purging receiving a Dynamic Host Control Protocol Version 6 (DHCPv6) CONFIRM message from the untrusted IPv6 node;

in response to receiving the DHCPv6 CONFIRM message, authenticating the untrusted IPv6 node in presence of only the DHCPv6 CONFIRM message by:

gleaning the IPv6 address for the untrusted IPv6 node from the DHCPv6 CONFIRM message, wherein the DHCPv6 CONFIRM message does not include the one or more IPv6 prefixes of the untrusted IPv6 node;

sending, to a DHCPv6 server, a DHCPv6 LEASEQUERY message using the IPv6 address for the untrusted IPv6 node;

receiving a DHCPv6 LEASEQUERY-REPLY from the DHCPv6 server, the DHCPv6 LEASEQUERY-REPLY indicating a confirmation of a valid lease and comprising the purged routing information for the untrusted IPv6 node;

repopulating routing information comprising at least the IPv6 address and the one or more IPv6 prefixes of the untrusted IPv6 node with the purged routing information received in the DHCPv6 LEASEQUERY-REPLY;

wherein the method is performed by an access concentrator.

2. The method of claim 1, wherein the untrusted IPv6 node is a customer premises equipment (CPE) router.

3. The method of claim 1, wherein the one or more access concentrators are selected from the group consisting of a cable modem termination system (CMTS), a digital subscriber line access multiplexer (DSLAM), and a cellular broadband concentrator.

4. The method of claim 1, wherein the interface reset is in response to a reset of a modem connecting the untrusted IPv6 node to the one or more access concentrators.

5. The method of claim 4, wherein the modem is selected from the group consisting of a cable modem, a DSL modem, and a wireless broadband modem.

6. The method of claim 1, wherein the gleaning is by a DHCPv6 relay agent.

7. A data processing method comprising:

purging routing information relating to an untrusted Internet Protocol Version 6 (IPv6) node in response to detecting an interface reset for the untrusted IPv6 node, the routing information comprising at least an IPv6 address and one or more IPv6 prefixes for the untrusted IPv6 node;

after the purging receiving a Dynamic Host Control Protocol Version 6 (DHCPv6) CONFIRM message for the untrusted IPv6 node;

in response to receiving the DHCPv6 CONFIRM message, authenticating the untrusted IPv6 node in presence of only the DHCPv6 CONFIRM message by:

gleaning the IPv6 address for the untrusted IPv6 node from the DHCPv6 CONFIRM message, wherein the DHCPv6 CONFIRM message does not include the one or more IPv6 prefixes of the untrusted IPv6 node;

relaying, to a DHCPv6 server, the DHCPv6 CONFIRM message with an embedded DHCPv6 LEASEQUERY message using the IPv6 address for the untrusted IPv6 node;

receiving a DHCPv6 REPLY from the DHCPv6 server, the DHCPv6 REPLY including a DHCPv6 LEASEQUERY-REPLY indicating a confirmation of a valid lease and comprising the purged routing information for the untrusted IPv6 node;

repopulating routing information comprising at least the IPv6 address and the one or more IPv6 prefixes of the untrusted IPv6 node with the purged routing information received in the DHCPv6 LEASEQUERY-REPLY;

wherein the method is performed by an access concentrator.

8. The method of claim 7, wherein the untrusted IPv6 node is a customer premises equipment (CPE) router.

9. The method of claim 7, wherein the one or more access concentrators are selected from the group consisting of a cable modem termination system (CMTS), a digital subscriber line access multiplexer (DSLAM), and a cellular broadband concentrator.

10. The method of claim 7, wherein the interface reset is in response to a reset of a modem connecting the untrusted IPv6 node to the one or more access concentrators.

11. The method of claim 10, wherein the modem is selected from the group consisting of a cable modem, a DSL modem, and a wireless broadband modem.

12. The method of claim 7, wherein the gleaning, the relaying, and the receiving is by a DHCPv6 relay agent.

* * * * *